United States Patent [19]

Adam

[11] Patent Number: 5,493,036
[45] Date of Patent: Feb. 20, 1996

[54] FIBRE-REACTIVE ANTHRAQUINONE DYES, THEIR PREPARATION AND THE USE THEREOF

[75] Inventor: Jean-Marie Adam, Rosenau, France

[73] Assignee: Ciba-Geigy Corporation, Tarrytown, N.Y.

[21] Appl. No.: 308,481

[22] Filed: Sep. 19, 1994

Related U.S. Application Data

[63] Continuation of Ser. No. 55,469, Apr. 29, 1993, abandoned.

[30] Foreign Application Priority Data

Apr. 5, 1992 [CH] Switzerland ............................ 1416/92

[51] Int. Cl.⁶ ........................ C09B 1/16; C07D 295/205; C07D 295/26
[52] U.S. Cl. .................................. 552/221; 8/445; 8/643; 8/676; 8/916; 8/924; 252/182.12; 252/182.3; 544/380; 552/209; 552/224; 552/225; 552/226; 552/227; 552/228; 552/230; 552/231; 552/232; 552/233; 552/234; 552/235; 552/237; 552/240; 552/241; 552/243; 552/244; 552/245; 552/247; 552/249; 552/251; 552/255; 552/258; 552/259
[58] Field of Search .......................... 252/182.12, 182.3; 552/209, 230, 236, 240, 241, 249, 251, 258, 259, 221, 224, 225–228, 231–235, 237, 243–245, 247; 544/380

[56] References Cited

U.S. PATENT DOCUMENTS

| | | | |
|---|---|---|---|
| 3,632,611 | 1/1972 | Kenmochi | 552/224 |
| 3,920,632 | 1/1975 | Hohmann | 540/531 |
| 4,301,080 | 11/1981 | Adam | 552/249 |
| 5,023,325 | 6/1991 | Tzikas | 534/618 |
| 5,081,296 | 1/1992 | Tzikas | 564/166 |
| 5,352,247 | 10/1994 | Adam | 552/258 |

OTHER PUBLICATIONS

E. R. Trotman, Dyeing and Chemical Technology of Textile Fibres, Fifth Edition (1975).

*Primary Examiner*—Emily Bernhardt
*Attorney, Agent, or Firm*—Kevin T. Mansfield

[57] ABSTRACT

The invention relates to fibre-reactive anthraquinone dyes of formula

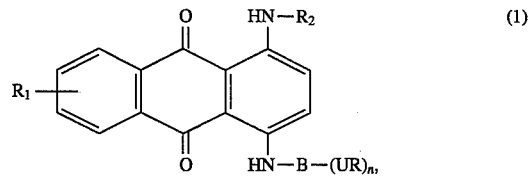

wherein $R_1$, $R_2$, B, U, R and n are as defined in claim 1. The anthraquinone dyes of formula (1) are suitable for dyeing or printing hydroxyl group containing or nitrogen-containing fibre materials and give dyeings or prints of good allround fastness properties.

3 Claims, No Drawings

FIBRE-REACTIVE ANTHRAQUINONE DYES, THEIR PREPARATION AND THE USE THEREOF

This application is a continuation of application Ser. No. 08/055,469 filed on Apr. 29, 1993 now abandoned.

The present invention relates to novel fibre-reactive anthraquinone dyes, to their preparation and to the use thereof for dyeing and printing fibre materials, especially textile fibre materials.

Specifically, the invention relates to fibre-reactive anthraquinone dyes of formula

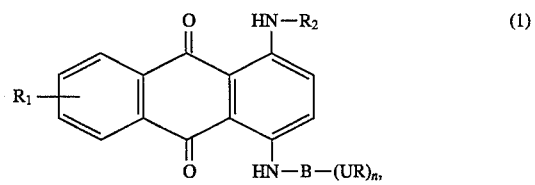

wherein $R_1$ is hydrogen, $C_1$–$C_4$alkyl, $C_1$–$C_4$alkoxy, $C_1$–$C_4$alkanoylamino, carboxy, hydroxy, sulfo or halogen, $R_2$ is an unsubstituted or substituted phenyl-$C_1$–$C_{12}$alkyl or phenyl-$C_5$–$C_7$cycloalkyl radical, B is phenyl which may be further substituted, U is the —CO— or —SO$_2$— radical, n is 1, 2, 3 or 4 and R is a radical of formula

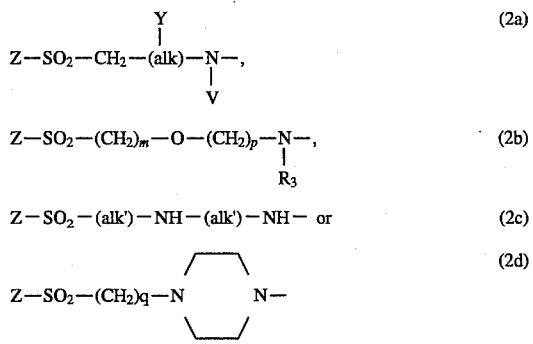

wherein

Z is β-sulfatoethyl, β-thiosulfatoethyl, β-phosphatoethyl, β-acyloxyethyl, β-haloethyl or vinyl, alk is an alkylene radical of 1 to 7 carbon atoms, Y is hydrogen, halogen, hydroxy, cyano, $C_1$–$C_4$alkanoyloxy, $C_1$–$C_5$ alkoxycarbonyl, carbamoyl or a —SO$_2$—Z radical, V is hydrogen, $C_1$–$C_4$alkyl which is unsubstituted or substituted by $C_1$–$C_2$alkoxy, halogen or hydroxy, or is a radical of formula

wherein Z, alk and Y have the given meanings, $R_3$ is hydrogen or $C_1$–$C_8$alkyl, alk' independently of one another is a polymethylene radical of 2 to 6 carbon atoms and m, p and q are each independently of one another 1, 2, 3, 4, 5 or 6.

$R_1$ as $C_1$–$C_4$alkyl is suitably methyl, ethyl, n-propyl, isopropyl, n-butyl, isobutyl, sec-butyl or tert-butyl. Methyl is preferred.

$R_1$ as $C_1$–$C_4$alkoxy is suitably methoxy, ethoxy, n-propoxy, isopropoxy, n-butoxy, isobutoxy, sec-butoxy or tert-butoxy. Methoxy is preferred.

$R_1$ as $C_2$–$C_4$alkanoylamino is typically acetylamino or propionylamino. Acetylamino is preferred.

$R_1$ as halogen is typically fluoro, chloro or bromo, preferably chloro.

The $C_1$–$C_{12}$alkylene group of a phenyl-$C_1$–$C_{12}$alkyl radical represented by $R_2$ may be straight-chain or branched. Illustrative examples of these alkylene groups are methylene, ethylene, n-propylene, isopropylene, n-butylene, isobutylene, sec-butylene, tert-butylene, as well as straight-chain or branched pentylene, hexylene, heptylene or octylene. $C_1$–$C_8$Alkylene is preferred, and sec-butylene is especially preferred.

The $C_5$–$C_7$cycloalkylene moiety of a phenyl-$C_5$–$C_7$cycloalkyl radical represented by $R_2$ may be cyclopentylene or cyclohexylene which is unsubstituted or substituted by $C_1$–$C_4$alkyl such as methyl or ethyl, and is preferably cyclohexylene.

$R_2$ in the phenyl ring may be unsubstituted or carries one or more than one substituent, conveniently $C_1$–$C_4$alkyl such as methyl or ethyl, $C_1$–$C_4$alkoxy such as methoxy and ethoxy, $C_2$–$C_4$alkanoylamino such as acetylamino or propionylamino, carboxy, hydroxy, sulfo or halogen such as fluoro, bromo or, preferably, chloro.

The substituent B in the phenyl ring may carry no further substituents or may be further substituted by the groups cited above as substituents of $R_2$ in the phenyl ring.

The radical of formula —UR is a fibre-reactive radical. By fibre-reactive radicals are meant those radicals that are able to react with the hydroxyl groups of cellulose, the amino, carboxyl, hydroxyl and thiol groups of natural polyamides, such as wool and silk, or with the amino and carboxyl groups of synthetic polyamides to form covalent chemical bonds. The anthraquinone dye of formula (1) may contain one to four radicals of formula —UR. The fibre-reactive radicals of formula —UR may be identical or different, and are preferably identical. n is preferably 1 or 2, most preferably 1.

β-Haloethyl represented by Z is preferably the β-chloroethyl radical and β-acyloxyethyl is preferably the β-acetoxyethyl radical. The alkylene radical alk is preferably methylene, ethylene, methylmethylene, propylene or butylene. The substituent Y as $C_1$–$C_4$alkanoyloxy is preferably acetoxy, propionyloxy or butyryloxy, and as $C_1$–$C_5$alkoxycarbonyl is preferably methoxycarbonyl, ethoxycarbonyl or propoxycarbonyl; and as halogen is preferably fluoro, chloro or bromo. If V is a $C_1$–$C_4$alkyl radical, said radical may be methyl, ethyl, n-propyl, isopropyl, n-butyl, isobutyl, sec-butyl or tert-butyl, which alkyl groups may be substituted by methoxy, ethoxy, hydroxy or halogen such as fluoro, chloro or bromo. The radical $R_3$ is typically methyl, ethyl, n-propyl, isopropyl, n-butyl, isobutyl, sec-butyl, tert-butyl or straight-chain or branched pentyl or hexyl, or preferably hydrogen. The polymethylene radicals alk' are preferably ethylene, propylene or butylene. The indices m, p and q are each independently of one another preferably 2, 3 or 4.

Preferred anthraquinone dyes of formula (1) are those wherein B is phenyl which carries no further substituents or is phenyl which is further substituted by $C_1$–$C_4$alkyl, $C_1$–$C_4$alkoxy, $C_2$–$C_4$alkanoylamino, carboxy, hydroxy, sulfo or halogen, preferably by methyl, methoxy or chloro.

$R_1$ is preferably hydrogen or halogen. Hydrogen is most preferred.

The anthraquinone dyes of formula (1) preferably contain a sulfo group in the phenyl ring of the radical $R_2$. The anthraquinone dyes of formula (1) preferably contain only one sulfo group.

Also preferred are anthraquinone dyes of formula (1) wherein $R_2$ is a phenyl-$C_1$–$C_8$alkyl or phenylcyclohexyl radical which is unsubstituted or substituted in the phenyl ring by $C_1$–$C_4$alkyl, $C_1$–$C_4$alkoxy, $C_2$–$C_4$alkanoylamino, carboxy, hydroxy, sulfo or halogen, preferably by sulfo.

Particularly preferred are fibre-reactive anthraquinone dyes of formula

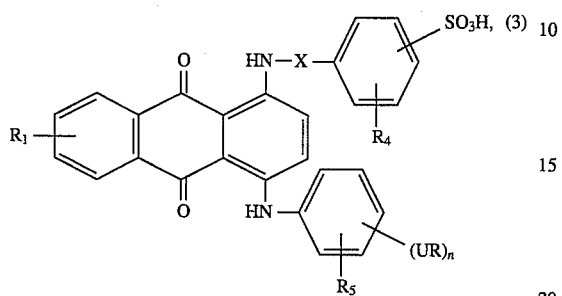

wherein $R_1$, $R_4$ and $R_5$ are each independently of one another hydrogen, $C_1$–$C_4$alkyl, $C_1$–$C_4$alkoxy, $C_2$–$C_4$alkanoylamino, carboxy, hydroxy, sulfo or halogen, X is a $C_1$–$C_8$alkylene or cyclohexylene radical, and U, R and n have the meanings and preferred meanings assigned to them above. Preferably $R_4$ is hydrogen. $R_5$ is preferably hydrogen, methyl, methoxy or chloro.

R is preferably a radical of formula (2a), (2c) or (2d), and is most preferably a radical of formula (2a).

U is preferably the —CO— radical.

The preferred meaning of Z is β-sulfatoethyl, β-thiosulfatoethyl, β-phosphatoethyl or vinyl. Preferably Z is the β-sulfatoethyl or vinyl radical, most preferably the β-sulfatoethyl radical.

Particularly interesting anthraquinone dyes are those wherein U is the —CO— radical, Z is β-sulfatoethyl, β-thiosulfatoethyl, β-phosphatoethyl or vinyl, and n is 1; R is preferably in this case a radical of formula (2a).

Particularly important anthraquinone dyes of formula (1) are those wherein B is phenyl which carries no further substituents or is phenyl which is further substituted by $C_1$–$C_4$alkyl, $C_1$–$C_4$alkoxy, $C_2$–$C_4$alkanoylamino, carboxy, hydroxy, sulfo or halogen, preferably by methyl, methoxy or chloro, $R_2$ is a phenyl-$C_1$–$C_8$alkyl or phenylcyclohexyl radical which is unsubstituted or substituted in the phenyl ring by $C_1$–$C_4$alkyl, $C_1$–$C_4$alkoxy, $C_2$–$C_4$alkanoylamino, carboxy, hydroxy, sulfo or halogen, preferably by sulfo, U is the —CO— radical, Z is β-sulfatoethyl, β-thiosulfatoethyl, β-phosphatoethyl or vinyl, and n is 1; preferably R in this case is a radical of formula (2a).

Anthraquinone dyes of very special interest are those of formula (3), wherein U is the —CO— radical, Z is β-sulfatoethyl, β-thiosulfatoethyl, β-phosphatoethyl or vinyl and n is 1; preferably R in this case is a radical of formula (2a).

Among these dyes, those dyes are of particular interest which contain at least one sulfo group and at last one sulfato group.

The invention further relates to a process for the preparation of the novel fibre-reactive anthraquinone dyes of formula (1), which comprises condensing a compound of formula

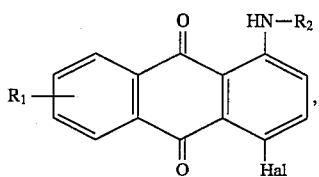

wherein Hal is halogen and $R_1$ and $R_2$ are as defined for formula (1), with an amine of formula $$NH_2—B—(UR)_n \qquad (5),$$

wherein B, U, R and n are as defined for formula (1), and subsequently, if desired, sulfating and/or sulfonating the condensation product, or condensing a compound of formula (4), wherein Hal is halogen and $R_1$ and $R_2$ are as defined for formula (1), with an amine of formula (5), wherein B, U, R and n are as defined for formula (1), and Z is β-hydroxyethyl, and subsequently sulfating or sulfating and sulfonating the condensation product.

The compounds of formula (4) and the amines of formula (5) are known or can be prepared by methods analogous to those for obtaining known compounds.

The compounds of formula (4), wherein $R_1$ is not hydrogen, are normally obtained as mixtures of isomers in which the individual isomers differ only with respect to the position of the substituent $R_1$ and $R_1$ is attached in either 6- or 7-position to the anthraquinone nucleus. If a start is made from such mixtures of isomers of compounds of formula (4), then the corresponding mixtures of isomers of the anthraquinone dyes of formula (1) are also obtained.

The condensation of the compound of formula (4) with an amine of formula (5) is preferably carried out in an organic medium (e.g. methyl or ethyl cellosolve, dimethoxy ethane, butanol, chlorobenzene or dichlorobenzene) in the temperature range from 90° to 150° C., depending on the boiling point of the solvent, in per se known manner, in the presence of a catalyst, conveniently copper powder or a copper salt such as copper chloride. It is also possible to use the amine itself as solvent.

The sulfation and sulfonation is carried out with oleum containing 1 to 10% of free $SO_3$, or with concentrated sulfuric acid, conveniently in the temperature range from 0° to 30° C.

The sulfation and sulfonation serves on the one hand to introduce a sulfo group into the anthraquinone dye and, on the other, if Z is a β-hydroxyethyl group, to convert the β-hydroxyethyl group into the β-sulfatoethyl group.

To prepare anthraquinone dyes wherein Z is a β-sulfatoethyl group, the condensation is preferably carded out using an amine of formula (5), wherein Z is β-hydroxyethyl, and subsequently sulfating the condensation product to convert the β-hydroxyethyl group into β-sulfatoethyl group, and additionally introducing a sulfo group into the anthrachinone dye.

It is preferred to make a start from compounds of formula (4), wherein Hal is bromo.

Preferred embodiments of the inventive process comprise
using an amine of formula (5), wherein B is phenyl which carries no further substituents or is phenyl which is further substituted by $C_1$–$C_4$alkyl, $C_1$–$C_4$alkoxy, $C_2$–$C_4$alkanoylamino, carboxy, hydroxy, sulfo or halogen, preferably by methyl, methoxy or chloro;

using a compound of formula (4), wherein $R_1$ is hydrogen or halogen, preferably hydrogen;

using a compound of formula (4), wherein $R_2$ is a phenyl-$C_1$–$C_8$alkyl or phenylcyclohexyl radical which is unsubstituted or substituted in the phenyl ring $C_1$–$C_4$alkyl, $C_1$–$C_4$alkoxy, $C_2$–$C_4$alkanoylamino, carboxy, hydroxy, sulfo or halogen, preferably by sulfo;

using an amine of formula (5), wherein U is the —CO— radical;

using an amine of formula (5), wherein R is a radical of formula (2a), (2c) or (2d), preferably a radical of formula (2a);

using an amine of formula (5), wherein R is a radical of formula (2a), (2c) or (2d), preferably a radical of formula (2a), and Z is β-hydroxyethyl, and subsequently sulfating and sulfonating the resultant condensation product.

A particularly preferred embodiment of the inventive process comprises condensing a compound of formula

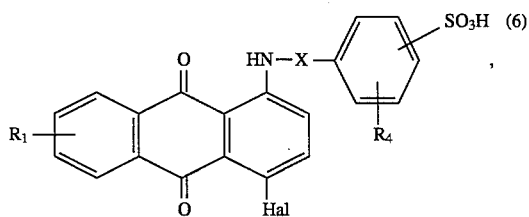

wherein $R_1$, $R_4$ and X are as defined for formula (3) and Hal is halogen, with an amine of formula

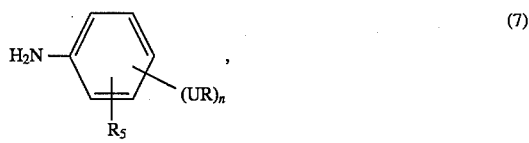

wherein $R_5$, U, R and n are as defined for formula (3), or condensing a compound of formula

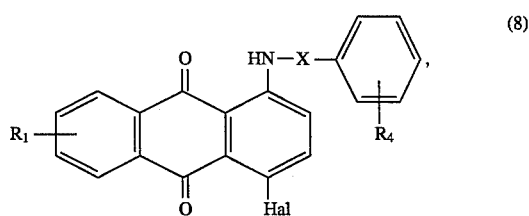

wherin $R_1$, $R_4$ and X are as defined for formula (3) and Hal is halogen, with an amine of formula (7), wherein $R_5$, U, R and n are as defined for formula (3) and Z is β-hydroxyethyl, and subsequently sulfating and sulfonating the condensation product.

The invention further relates to mixtures of fibre-reactive anthraquinone dyes which contain at least two fibre-reactive anthraquinone dyes of formula (1). The indicated meanings and preferences stated above in connection with the anthraquinone dyes of formula (1) apply to the mixture components.

Mixtures of isomers of the anthraquinone dyes of formula (1) are preferred in which the individual isomers differ only with respect to the position of the substituents $R_1$ and $R_1$ is attached in either 6- or in 7-position to the anthraquinone nucleus.

The novel anthraquinone dyes of formula (1) are obtained either in the form of the free sulfonic acid or, preferably, of their salts.

Suitable salts are typically the alkali metal, alkaline earth metal or ammonium salts or the salts of an organic amine. Illustrative examples are the sodium, lithium, potassium or ammonium salts or the salt of mono-, di- or triethanolamine.

The anthraquinone dyes of formula (1) are suitable for dyeing or printing a wide range of fibre materials such as hydroxyl group-containing or nitrogen-containing fibre materials.

Such fibre materials are typically natural cellulosic fibres such as cotton, linen or hemp, as well as cellulose and regenerated cellulose. The novel anthraquinone dyes are particularly suitable for dyeing natural polyamide fibres such as wool, preferably synthetic polyamide fibre materials such as polyamide 6 or polyamide 66, and are suitable for dyeing or printing blends or yarns of wool and synthetic polyamide. The anthraquinone dyes of formula (1) are particularly suitable for dyeing or printing natural polyamide fibre materials, preferably wool.

The cited textile material may be in any form of presentation, typically fibres, yarn, wovens or knitgood goods.

The anthraquinone dyes of formula (1) are suitable for conventional dyeing or printing methods and can be applied to, and fixed on, the fibre material by a wide variety of means, preferably in the form of aqueous dye solutions or print pastes. They are suitable for dyeing by the exhaust process as well as by the pad process, in which the goods are impregnated with aqueous dye solutions which may or may not contain salt, and the dyes are fixed after treatment with alkali or in the presence of alkali, with or without the application of heat. The novel anthraquinone dyes are also suitable for the cold pad-batch process, in which the dye is applied together with the alkali on the pad and subsequently fixed by storing the fabric for several hours at room temperature.

It is preferred to dye natural and synthetic polyamide fibre materials, especially wool, by the exhaust process in the pH range of about 3–7, preferably 3–5, and conveniently in the temperature range from 70°–110° C., preferably from 90°–100° C.

In addition to water and the dyes, the dye liquors or printing pastes may contain further ingredients, typically wetting agents, antifoams, levelling agents or textile improvers such as fabric softeners, flame retardants or dirt, water and oil repellents as well as water softeners and natural or synthetic thickeners, typically alginates and cellulose ethers.

The anthraquinone dyes of formula (1) produce level dyeings of good allround fastness properties, especially good fastness to washing, rubbing, wet treatments, wet rubbing and light. The novel anthraquinone dyes also have level build-up, good affinity, good fixation and good compatibility with other dyes. When using the anthraquinone dyes of formula (1) it is possible to dispense with the conventional aftertreatment of the dyes or prints with fixing agents.

In the following Examples parts are by weight and the relationship between parts by weight and parts by volume is the same as that between the gram and the cubic centimeter.

EXAMPLE 1

A mixture of 24 parts of 1-chloroanthraquinone and 35 parts of phenyl sec-butylamine is stirred for 15 hours at a temperature of 155° C. Any remaining phenyl sec-butylamine is removed by steam distillation and the reaction product of formula

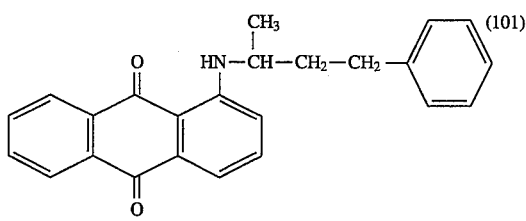

is isolated.

17 parts of this product are stirred in 75 parts of n-butanol at a temperature of 35° C. and, after addition of 8 parts of bromine, the temperature of the reaction mixture is kept for 15 hours at 40°–50° C. The solvent is stripped off under vacuum and the intermediate of formula

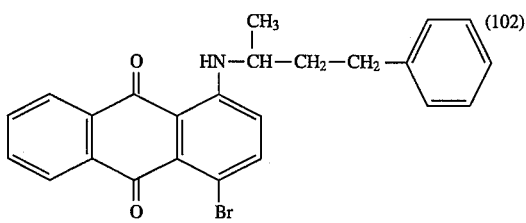

is isolated by filtration.

EXAMPLES 2 TO 11

The procedure described in Example 1 is repeated, replacing 35 parts of phenyl sec-butylamine with an equimolar amount of an amine of formula $NH_2$—$W_1$ to give an analogous intermediate of formula

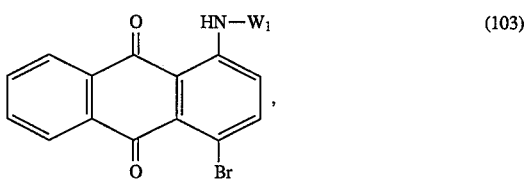

in which $W_1$ in the amine of formula $NH_2$—$W_1$ and in the intermediate of formula (103) has the meanings given in column 2 of Table 1.

TABLE 1 intermediate of formula

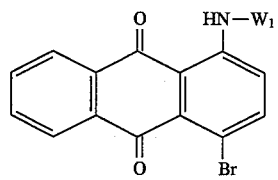

| Ex. | $W_1$ |
|---|---|
| 2 |  |
| 3 | 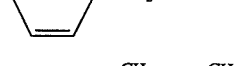 |

TABLE 1-continued intermediate of formula

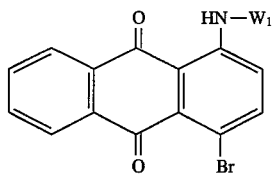

| Ex. | $W_1$ |
|---|---|
| 4 | 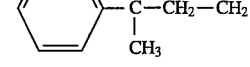 |
| 5 | 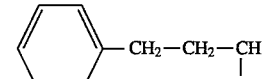 |
| 6 |  |
| 7 |  |
| 8 | 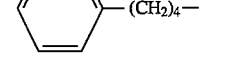 |
| 9 | 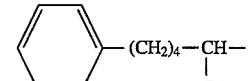 |
| 10 | 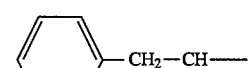 |
| 11 |  |

EXAMPLE 12

17 parts of the intermediate prepared according to Example 1, 15 parts of N-β-(β'-hydroxyethylsulfonyl)ethyl 3-aminobenzamide, 5 parts of potassium acetate and 0.2 part of copper chloride are added to 50 parts of ethyl cellosolve and the mixture is heated for 10 hours, with stirring, at a temperature of 100°–105° C. The mixture is allowed to cool and the precipitated product of formula

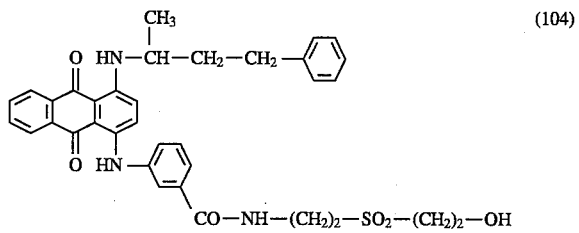

is isolated by filtration.

To prepare the sulfated sulfuric acid ester, the well-dried compound of formula (104) is added to the three-fold amount by weight of sulfuric acid monohydrate and the mixture is stirred until a complete solution is obtained. The resultant solution is poured on to ice to precipitate the sulfated product. The precipitate is isolated by filtration and then stirred in a mixture of ice and water. After neutralisation with sodium carbonate, the product is salted out by strewing in sodium chloride, isolated by filtration and dried, giving a reactive dye which, in the form of the free acid, corresponds to the compound of formula

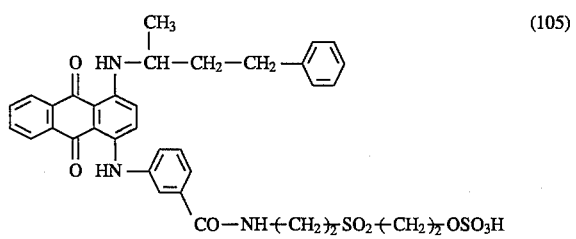

(105)

and dyes wool in a greenish-blue shade. Dye fixation is good.

This dye is obtained in the corresponding vinyl form by treating the dye of formula (105) with an aqueous solution of sodium hydroxide at pH 9.

EXAMPLES 13–22

The procedure of Example 12 is repeated, replacing 17 parts of the intermediate of formula (102) obtained according to Example 1 with an equimolar amount of one of the intermediates obtained according to Examples 2–11, giving analogous reactive dyes which, in the form of the free acid, correspond to the compound of formula

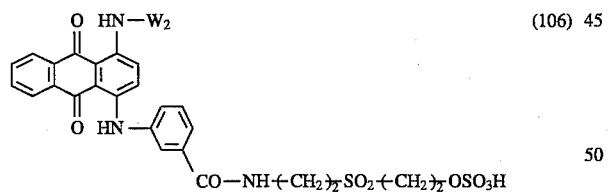

(106)

wherein $W_2$ has the meanings given in column 2 of Table 2. The reactive dyes listed in Table 2 dye wool in blue shades.

TABLE 2

Reactive dye of formula

![structure]

| Ex. | $W_2$ |
|---|---|
| 13 | $HO_3S$—⟨⟩—$CH_2$— |
| 14 | $HO_3S$—⟨⟩—$C(CH_3)_2$—$CH_2$—$CH(CH_3)$— |
| 15 | $HO_3S$—⟨⟩—$C(CH_3)_2$—$CH_2$—$CH_2$— |
| 16 | $HO_3S$—⟨⟩—$CH_2$—$CH_2$—$CH(CH_2$—$CH(CH_3)_2)$— |
| 17 | $HO_3S$—⟨⟩—⟨H⟩— |
| 18 | $HO_3S$—⟨⟩—$(CH_2)_4$— |
| 19 | $HO_3S$—⟨⟩—$(CH_2)_4$—$CH(CH_3)$— |
| 20 | $HO_3S$—⟨⟩—$CH_2$—$CH(CH_3)$—$CH(CH_3)$— |
| 21 | $HO_3S$—⟨⟩—$CH_2$—$CH(CH_3)$— |
| 22 | $HO_3S$—⟨⟩—$CH_2$—$CH(C_2H_5)$— |

EXAMPLE 23–30

The procedure of Example 12 is repeated, replacing 15 parts of N-β-(β'-hydroxyethylsulfonyl)ethyl 3-aminobenzamide with an equimolar amount of a compound of formula

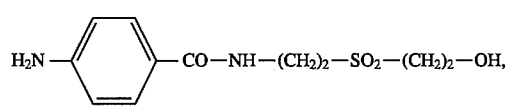

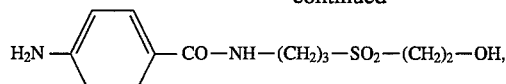
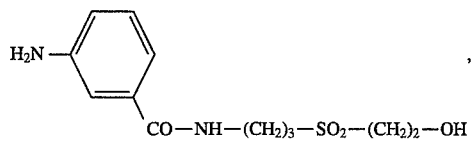
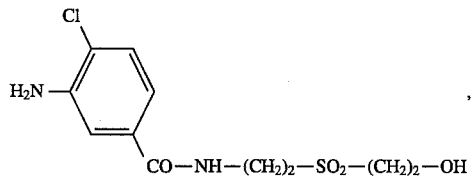
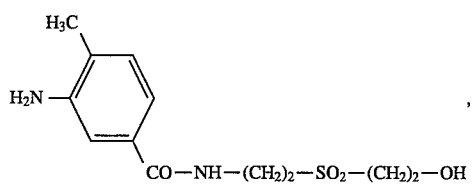
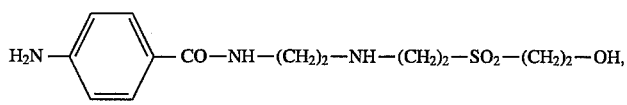
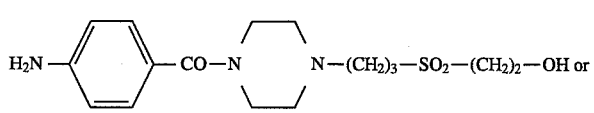
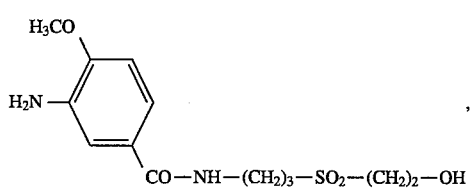
to give analogous reactive dyes which, in the form of the free acid, correspond to the compound of formula
 (107)
wherein $W_3$ has the meanings given in column 2 of Table 3. The reactive dyes listed in Table 3 dye wool in blue shades.
TABLE 3
Reactive dye of formula
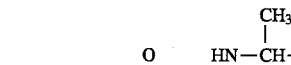
| Ex. | $W_3$ |
|---|---|
| 23 | 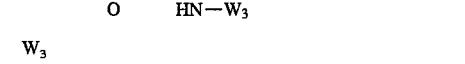 —CO—NH—$(CH_2)_2$—$SO_2$—$(CH_2)_2$—$OSO_3H$ |

TABLE 3-continued

Reactive dye of formula

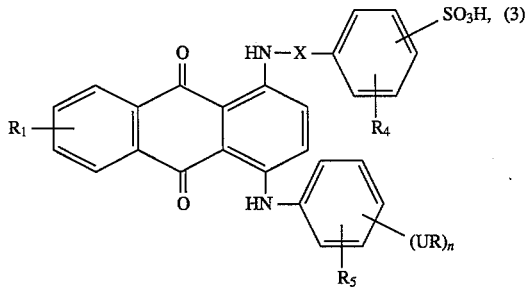

| Ex. | $W_3$ |
|---|---|
| 24 | —⌬—CO—NH—(CH$_2$)$_3$—SO$_2$—(CH$_2$)$_2$—OSO$_3$H |
| 25 | —⌬—CO—NH—(CH$_2$)$_3$—SO$_2$—(CH$_2$)$_2$—OSO$_3$H (meta) |
| 26 | Cl-substituted —⌬—CO—NH—(CH$_2$)$_2$—SO$_2$—(CH$_2$)$_2$—OSO$_3$H |
| 27 | H$_3$C-substituted —⌬—CO—NH—(CH$_2$)$_2$—SO$_2$—(CH$_2$)$_2$—OSO$_3$H |
| 28 | —⌬—CO—NH—(CH$_2$)$_2$—NH—(CH$_2$)$_2$—SO$_2$—(CH$_2$)$_2$OSO$_3$H |
| 29 | —⌬—CO—N(piperazine)N—(CH$_2$)$_3$—SO$_2$—(CH$_2$)$_2$—OSO$_3$H |
| 30 | H$_3$CO-substituted 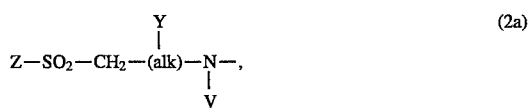 —⌬—CO—NH—(CH$_2$)$_3$—SO$_2$—(CH$_2$)$_2$—OSO$_3$H |

Analogous reactive dyes which dye wool in blue shades are obtained by carrying out the procedure described in Example 23, 24, 25, 26, 27, 28, 29 or 30, and replacing 17 parts of the intermediate of formula (102) obtained according to Example 1 with an equimolar amount of one of the intermediates obtained in Examples 2–11.

Dyeing Example

A dyebath is prepared from 2000 parts of water, 5 parts of sodium sulfate, 4 parts of sodium acetate, 1 part of a levelling agent (based on the condensate of a higher aliphatic amine and ethylene oxide) and 1.9 parts of the dye of Example 12, and the pH of the dyebath is adjusted to 5.5 with acetic acid. 100 parts of woollen fabric are put into this dyebath, which is heated to c. 100° C. over 50 minutes. Dyeing is carried out for 1 hour at this temperature. The fabric is rinsed and dried, giving a greenish-blue dyeing of very good wetfastness properties.

What is claimed is:

1. A fibre-reactive anthraquinone dye of the formula $$\text{anthraquinone with } R_1, HN-X-\text{phenyl-SO}_3H, R_4, HN-\text{phenyl-}(UR)_n, R_5 \quad (3)$$

wherein $R_1$, $R_4$ and $R_5$ are each independently of one another hydrogen, $C_1$–$C_4$alkyl, $C_1$–$C_4$alkoxy, $C_2$–$C_4$alkanoylamino, carboxy, hydroxy, sulfo or halogen, X is a $C_1$–$C_8$alkylene radical, U is the —CO— radical, n is 1 and R is a radical of the formula $$Z-SO_2-CH_2-(alk)-\underset{\underset{V}{|}}{\overset{\overset{Y}{|}}{N}}-, \quad (2a)$$

wherein

Y and V are hydrogen,

Z is β-sulfatoethyl and alk is an alkylene radical of 1 to 7 carbon atoms, and in which dye of the formula (3) the group of the formula —(UR$_n$) is bonded meta to the —NH— bridge to the anthraquinone nucleus.

2. A fibre-reactive anthraquinone dye according to claim 1, wherein X sec-butylene.

3. A mixture of fibre-reactive anthraquinone dyes which contains at least two isomeric fibre-reactive anthraquinone dyes of formula (3) according to claim 1, which isomers differ from each other only with respect to the position of the substituent $R_1$, wherein $R_1$ is not hydrogen and is attached in either the 6- or 7-position to the anthraquinone nucleus.

* * * * *